United States Patent Office 3,310,602
Patented Mar. 21, 1967

3,310,602
CURING EPOXIDE RESINS WITH AROMATIC AMINE-ALDEHYDE COORDINATION COMPLEXES
Peter Herbert Richard Bryan Lemon, Chandlers Ford, Hants, and Francis John Peskett, Southampton, England, assignors to The Borden Company, a corporation of New Jersey
No Drawing. Filed July 26, 1962, Ser. No. 212,704
2 Claims. (Cl. 260—834)

This invention relates to hardenable epoxide resin compositions and, more especially, to such compositions comprising a latent hardening agent.

The invention has for an object the provision of hardening agents which, when suitably admixed with an epoxide resin, give compositions which have an extended life at normal temperature but harden rapidly at elevated temperatures.

In the specification of British Patent No. 836,695 we have described a thermosettable composition comprising an epoxide resin in admixture with a polyamine-metallic salt coordination complex which is unstable at a temperature of from 60°–200° C. According to the specification cited, suitable polyamines include ethylene diamine and diethylene triamine and suitable metal salts are the halides of zinc and cadmium. Thermosettable compositions of the type described are stable for long periods at normal temperatures but cure rapidly when heated above the decomposition temperature of the coordination complex.

However, where the polyamine employed for the production of the coordination complex is an aliphatic polyamine, the compositions produced on mixing with an epoxide resin have a number of disadvantages. For example, the rapid release at elevated temperature of aliphatic amines, which react very quickly and exothermically with epoxide groups, often results in formation of blow holes or voids in castings. In addition, the cured products obtained have low heat distortion points and chemical resistance inadequate for many applications.

We have now found that these several disadvantages may be overcome by employing, as the polyamine/metallic salt complex, a coordination complex of an aromatic polyamine and a metallic salt.

Accordingly the present invention comprises thermosettable compositions comprising an epoxide resin and, as hardening agent therefor, a coordination complex of a metallic salt and an aromatic amine having at least 2 primary amine groups per molecule, said complex undergoing thermal degration to release the free amine at a temperature within the range 60°–200° C.

The present invention also includes the method for hardening epoxide resins which comprises forming a mixture of an epoxide resin and said coordination complex by subjecting the mixture so formed to heat, so as to release the amine.

Further, in accordance with the invention there is provided a thermoset composition prepared by heat-curing said thermosettable composition.

The products are particularly useful as moulding powders, or for the production of laminates by the pre-impregnation technique. They may also be employed, however, in many other fields where an extended storage life but high reactivity at elevated temperatures is desired. They are useful as adhesives, coatings impregnants and encapsulating material.

The epoxide resin used is amine-curable and the product of epoxidizing any polyhydric alcohol or polyhydric phenol of the formula $R(OH)_n$ in which R is the polyvalent hydrocarbon radical, of valence $n$, of a polyhydric alcohol or phenol and $n$ is an integer having the value of at least 2 and suitably not more than 6. Examples of the polyhydric alcohols to be used are resorcinol, 4,4'-isopropylidenediphenol (bisphenol A), ethylene glycol, polyglycols such as poly $C_2$–$C_4$ glycols of molecular weight 106 to 400 or higher, and glycerol. The condensation (epoxidized) product is a complex mixture of glycidyl ethers. The principal product formed, for example, with a dihydric alcohol or phenol of the formula $R(OH)_2$ and epichlorohydrin consists substantially of unbranched chain molecules having the general formula:

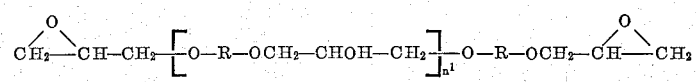

in which $n^1$ is an integer corresponding to one less than the number of moles of the alcohol represented in the product. Examples of the value of $n$ are 0–10.

For the purpose of the present specification, the term "gram epoxy equivalency" means the average number, expressed as gram equivalents, of 1:2 epoxy groups

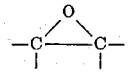

per 100 grams of the epoxide resin. We use to advantage the epoxidized products having an epoxy equivalency of at least 1.5.

In place of epichlorohydrin, as the epoxidizing agent, there may be used dichlorohydrin, and like conventional epoxidizing agents in contact with an alkali such as sodium hydroxide.

The coordination complexes are prepared to advantage by stirring the solid metallic salt in an alcoholic or like solution of the aromatic amine to be represented in the complex. The complex, which precipitates, is then recovered as by filtration. Other solvents that may be used in place of alcohol are organic liquids chemically inert to the reactants used but solvents for the amine, e.g., acetone, methyl ethyl ketone, "Methyl Cellosolve" (monomethyl ether of ethylene glycol), cyclohexanone, methanol and mixtures thereof.

Aromatic amines which are suitable for the purpose of the invention are those which have an average of at least 2 primary amine groups per molecule. They may be mono-, di-, tri- or higher polynuclear and may have the amino groups attached to the same nucleus or different nuclei. Examples of suitable amines are m-phenylene diamine, m-toluylene diamine, p-phenylene diamine, diaminodiphenylmethane and diaminodiphenylpropane. Particularly suitable are aromatic amine-aldehyde condensation products, such as those formed by reacting aniline, chloro-, bromo-, or other haloanilines, nuclear alkyl ($CH_2$, $C_2H_5$, $C_3H_7$, etc.) substituted anilines, phenylene or toluylene diamines, diamino-diphenylalkanes and the like with aldehydes, such as formaldehyde, acetaldehyde, and furfuraldehyde.

Monoamines may be used when mixed with aromatic polyamines of kind and in amount to raise the average number of the amino groups to at least 2 per mole.

A wide variety of metal salts may be employed to form the coordination complexes with the aromatic amines. The salts include the halides (chlorides, bromides, etc.), nitrates, sulphates, and other water-soluble salts of titanium, chromium, vanadium, maganese, iron, cobalt, nickel, copper, zinc, and metals of valence 2-4 known to form coordination complexes with ammonia that are stable in water (cf. Kirk and Othmer, Encyclopedia of Chemical Technology, vol. 4, 383.) These exclude the alkali and alkaline earth metals.

Proportions are shown in the following table as those which are permissible and those recommended for commercial operations.

| Component | Parts for 100 of Epoxide Resin | |
| --- | --- | --- |
| | Permissible | Recommended |
| Amine | 10-80 | 30-40 |
| Total coordination complex | 30-150 | 50-70 |
| Epoxy equivalent in resin | 0.02-1.50 | 0.45-1.2 |
| Metal salt | (1) | (1) |

[1] Amount to coordinate amine.

The proportion of such metal salts as those of cadmium, zinc, and copper is ordinarily that providing about 0.7-2.5 atoms of the metal for each 2 primary amine groups in the amine used.

The following examples illustrate the invention, proportions here and elsewhere herein being expressed as parts by weight unless specifically stated to the contrary.

*Example 1*

A polyepoxy resin was prepared as follows: 2.5 moles of bisphenol A was mixed with 24 moles of epichlorohydrin and the equivalent amount of solid sodium hydroxide added over 90 minutes while maintaining the temperature of the reactants at 85° C. The reaction was considered to be complete when the pH of the reaction mixture, as measured on an aqueous extract, had fallen to 7.0. Excess epichlorohydrin was then removed by distilling under vacuum until the temperature of the reactants had risen to 150° C. The resinous mixture was then dissolved in an excess of toluene and the salt allowed to settle. The resin solution was finally removed by decanting and subjected to distillation under pressure to remove toluene. The resultant resin had a viscosity of 150 poises.

This resin is hereinafter referred to as "Resin A."

A coordination complex was prepared as follows: 150 gms. of meta-phenylene diamine were dissolved in 1,500 gms. of industrial methylated spirit (190 proof ethyl alcohol containing 5% by volume of methanol) and the solution warmed to 60° C. While stirring, 150 gms. of cadmium bromide was added in six equal lots, the temperature being maintained at 60° C. for ½ hour. The solution was then cooled to room temperature and the product, which was a gray solid, was filtered off and dried at 40° C.

75 gms. of the coordination complex prepared as above were then intimately mixed with 100 gms. of "Resin A." The mixture was stable for at least 3 months at room temperature but hardened to an infusible condition in 4½ minutes at 150° C.

*Example 2*

A coordination complex from zinc bromide and an aniline-aldehyde condensate was made as follows:

263 gms. of aniline and 86 gms. of 44% formalin solution were allowed to react at 65°-75° C. in the presence of 324 gms. of 32 TW hydrochloric acid for 1 hour, after which time the acid was neutralized by adding aqueous sodium hydroxide. The precipitate so obtained was washed with water to remove salt and then dried to give a semi-solid resinous material. 350 gms. of this product were then dissolved in 2,000 gms. of industrial methylated spirit by warming to 60° C. 240 gms. of zinc bromide were then admixed in six lots, with stirring, the temperature being maintained at 60° C. for ½ hour after each addition. The coordination product so formed was then isolated by filtration and dried at 40° C.

60 parts of the aniline —$ZnBr_2$ coordination complex so made were then mixed with 100 parts of "Resin A." The mixture which was stable on storage at room temperature, cured to an infusible condition on heating for 3 minutes at 150° C.

*Example 3*

The procedure and compositions of Example 1 were used except that anhydrous copper sulfate and 4,4'-diaminodiphenylmethane were substituted in the same amounts for the bromide and diamine, respectively in Example 1. The product mixed with "Resin A" as described in Example 1 showed a gel time of about 5 minutes at 150° C.

*Example 4*

The procedure and composition of Example 1 are used except that the meta-phenylene diamine there recited is replaced in turn by 150 gms. of each of the other aromatic amines disclosed herein and of the said condensation product of the said amines with each of the following aldehydes: formaldehyde, acetaldehyde, and furfuraldehyde.

*Example 5*

The procedure and composition of Example 1 are used except that the cadmium bromide there recited is replaced in turn by 0.6 gm. mole of the bromide of each of the following: titanium, chromium, vanadium, manganese, iron, cobalt, nickel, copper and zinc.

It will be understood that it is intended to cover all changes and modifications of the examples of the invention herein chosen for the purpose of illustration which do not constitute departures from the spirit and scope of the invention.

We claim:

1. A resin composition that is stable at room temperatures, and relatively slowly curable at temperatures within the range 60°-200° C., the composition comprising:
   (1) an amine curable epoxide resin having gram epoxy equivalency of at least 1.5 for 100 grams of said resin; and,
   (2) a coordination complex in proportion of between about 30-150 parts by weight for 100 parts of said resin, said complex being:
      (a) a water-soluble inorganic salt of a metal selected from the group consisting of titanium, chromium, vanadium, manganese, iron, cobalt, nickel, copper, zinc and cadmium and the anionic portion of said ionorganic salt being selected from the group consisting of halides, nitrates, and sulfates; with,
      (b) condensation products of aromatic amines having at least two primary amine groups per molecule with aldehydes selected from the group consisting of formaldehyde, acetaldehyde, and furfuraldehyde.

2. The resin composition of claim 1 wherein said epoxide resin is the reaction product of 4,4'-isopropylidenediphenol with an excess of ethylene chlorohydrin, and said coordination complex consists essentially of a condensation product of metaphenylene diamine and formaldehyde with an equal weight of cadmium bromide.

(References on following page)

References Cited by the Examiner

UNITED STATES PATENTS

| | | | |
|---|---|---|---|
| 2,824,083 | 2/1958 | Parry et al. | 260—47 |
| 2,881,149 | 4/1959 | Neut et al. | 260—834 |
| 2,994,669 | 8/1961 | Hader | 260—72.5 |
| 3,058,948 | 10/1962 | Mosimann et al. | 260—47 |
| 3,067,170 | 12/1962 | Carey | 260—47 |
| 3,069,444 | 12/1962 | Wasserman et al. | 260—429 |
| 3,087,947 | 4/1963 | Foster et al. | 260—429 |

OTHER REFERENCES

Chemical Abstracts, 46:2437c, d. (1952).
J. Pharm. Soc., Japan 71, 1134–9 (1951).

MURRAY TILLMAN, *Primary Examiner.*
WILLIAM H. SHORT, SAMUEL H. BLECH,
*Examiners.*

T. D. KERWIN, P. LIEBERMAN,
*Assistant Examiners.*